United States Patent Office 3,116,054
Patented Dec. 31, 1963

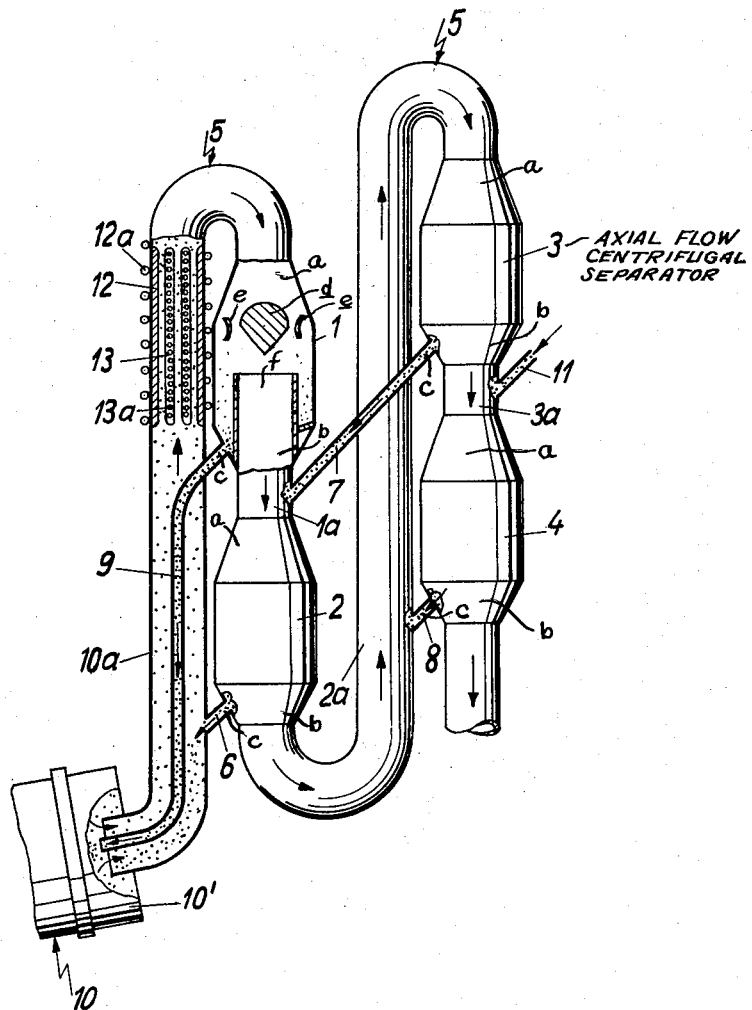

3,116,054
HEATING ARRANGEMENT
Rüdiger J. W. G. Bartmann, Rheinhausen (Lower Rhine), Germany, assignor to Beteiligungs- und Patentverwaltungsgesellschaft mit beschränkter Haftung, Essen, Germany
Filed July 13, 1961, Ser. No. 124,963
Claims priority, application Germany July 26, 1960
9 Claims. (Cl. 263—32)

The present invention relates to a heating arrangement.

More particularly, the present invention relates to an arrangement for heating fine-grained material, as, for example, raw cement powder.

In the manufacture of cement, it is frequently desired to utilize the heat of the furnace exhaust gases formed during the combustion process for preheating the cement powder. It is known to carry out such preheating by means of a number of tangential or centrifugal powder separators or cyclones which are so interconnected with each other by means of pipe conduits that the exhaust gases of the furnace are passed through the separators one after the other, the powder discharge of each separator, except that of the first, being fed to the exhaust gas conduit section leading to the preceding separator. The first separator is connected with the furnace. The raw powder is fed from the exhaust gas feed conduit of the last separator, is again separated from the exhaust gases in the separator, and is then introduced into the exhaust gas feed conduit of the next-to-last separator. There the process is repeated and the raw powder thus travels through the powder discharge conduits such that there will be a step-wise counter-current flow of the powder discharge with respect to the exhaust gases.

In the known arrangements of the type described above, there exists the danger that deleterious substances, such as condensed alkali aerosols and raw powder, will cake and clog in the first separator following the furnace, because it is there that the actual heat and temperature exchange between the hot exhaust gas and the cooler raw powder occurs. Unfortunately, this first separator is generally accessible only with difficulty, so that the plant has to be shut down in order to make it possible to clean the clogged first separator.

Moreover, existing arrangements are so constructed that the direction of the flow of exhaust gases is frequently made to change abruptly, so that a powerful blower system has to be provided to force the exhaust gases through the serially connected separators.

It is, therefore, an object of the present invention to provide a heating arrangement which overcomes the above disadvantages, i.e., a heating system in which the first heat exchange stage, which is particularly vulnerable to clogging, will be kept clear.

It is another object of the present invention to provide a heating system in which the individual heat exchange stages are so arranged that the flow of exhaust gases will not be deflected as often as in known heating systems, so that the conduit losses are lower, thereby making it possible to use exhaust blowers of lower power rating.

With the above objects in view, the present invention resides mainly in an arrangement for heating fine-grained material, which arrangement comprises a plurality of axial flow centrifugal powder separators arranged in pairs such that the separators of each pair are located one above the other and the pairs of separators are located next to each other at approximately the same height, and exhaust gas conduit means serially connecting the separators to each other and to a furnace such that exhaust gases from the furnace are fed through the separators one after the other. Each section of the exhaust gas conduit means which connects the separators of one pair is arranged at least substantially vertically and is fashioned as a mixing chamber, and each section of the exhaust conduit means which connects each separator pair with the one next to it extends approximately parallel to the separators. Also provided are powder conduit means for feeding the powder discharge of each separator except the first to the section of exhaust conduit means which leads to the preceding separator and for feeding the powder discharge of the first separator to the charging end of the furnace.

According to a preferred embodiment of the present invention, the section of the powder conduit means which feeds the powder discharge of the first separator to the charging end of the furnace passes through the section of the exhaust gas conduit means which feeds exhaust gases from the charging end of the furnace to the first separator, preferably such that the powder and the exhaust gases are in counter-current flow.

By virtue of the above, the heat and temperature exchange in the first heat exchanger stage, which is vulnerable to clogging, does not take place in the first separator but in the feed conduit section which is connected ahead in the circuit. Because this feed conduit section has a large cross section, there will be no clogging due to deleterious substances, which in the following specification and claims are deemed to include condensing alkali aerosols and raw powder. Any caking that does form can easily be removed even while the plant is in operation.

According to another feature of the present invention, a part of the exhaust gas conduit means section which places the furnace in communication with the first separator is provided with separating means, such as a good heat-conductive lining and/or coolable precipitation sheets. In this way, the unavoidable condensation of the alkali aerosols can be limited to a particular place, thereby facilitating the maintenance and cleaning of the heat exchanger and increasing the operating reliability of the entire plant.

Additional objects and advantages of the present invention will become apparent upon consideration of the following description when taken in conjunction with the accompanying drawings in which the single FIGURE is a diagrammatic illustration of a heating arrangement according to the present invention.

Referring now to the drawing, the same shows a plurality of axial flow centrifugal separators which are serially connected by exhaust gas conduit means to a rotating tubular furnace 10 such that the exhaust gases from this furnace will flow through all of the separators one after the other. The separators are numbered sequentially 1, 2, 3, 4, in the direction in which these exhaust gases flow. Each separator has, at its top, axial inlet means $a$ through which powder enters while flowing in axial direction, at its bottom, axial outlet means $b$ through which the non-separated powder leaves while flowing in axial direction, and powder discharge means $c$ through which the separated powder leaves. As is illustrated in the case of separator 1, the incoming powder-laden inflow is centrifuged about a central divider $d$ by means of circumferentially arranged baffles $e$ which twirl the medium passing through the separator and thus cause the heavier powder particles to be centrifuged outwardly so that the same will reach the powder discharge means $c$ while the remaining medium flows through the centrally positioned tube $f$ to the outlet means $b$. This type of axial flow centrifugal separator is well known and is shown, for example, in "Tonindustrie-Zeitung," volume 77 (1953), page 50, so that no claim for such a separator per se is made.

The separators are arranged in pairs 1, 2; 3, 4, with the separators of each pair being in a descending leg of a pipe form 5 and with the pairs of separators being located next to each other at approximately the same height. The separators of each pair are connected together by exhaust gas conduit sections 1a, 3a, which are internally fashioned as mixing chambers. The sections 1a, 3a, are oriented at least substantially vertically, i.e., vertically as shown in the drawing or with a substantial inclination so as to be almost vertical. Each exhaust gas conduit section which connects a separator pair with the pair next to its extends approximately parallel to the separators. In the drawings, only the exhaust gas conduit section 2a, which connects the first separator pair 1, 2, with the next succeeding separator pair 3, 4, is shown.

The powder conduit means of each separator except the first, i.e., the conduit sections 6, 7, and 8, pertaining to the separators 2, 3, and 4, respectively, feed the separated powder from these separators to the exhaust gas conduit section supplying the preceding separator, i.e., the conduit sections 6, 7, and 8, lead to the exhaust gas conduit sections 10a, 1a, and 2a, respectively, it being noted that the exhaust gas conduit section 10a, which is the first ascending leg of the worm 5, is the section which acts as a feed pipe leading exhaust gases from the charging end 10′ of the furnace 10 to the first separator 1. Powder separated by a succeeding separator (not shown) is introduced into the exhaust gas conduit section 3a by way of a powder conduit section 11.

The powder separated from the first separator 1 passes through a powder conduit section 9, which discharges into the charging end 10′ of the furnace 10. As is shown in the drawing, the section 9 is arranged within the section 10a so that the powder in section 9 and the exhaust gases in section 10a will be in counter-current flow, thereby obtaining good heat exchange between the powder and the exhaust gases and a very substantial preheating of the powder.

In order to localize the precipitation of deleterious substances, separating means are provided in the exhaust gas conduit section 10a which feeds exhaust gases from the charging end 10′ of the furnace 10 to the first separator 1. These separating means may comprise a lining 12 made of a material having good heat-conductivity characteristics which lining may, if desired, be surrounded by a cooling coil 12a. Alternatively or additionally, precipitation sheets 13 may be arranged interiorly of the section 10a and equipped with coling coils 13a.

By virtue of the above-described arrangement, the flow of exhaust gases is abruptly deflected only a few times. The pressure drop is therefore small and the exhaust ventilator can have a correspondingly low power rating. Nevertheless, a high throughput is obtained despite relatively small dimensions and low space requirements.

It will be understood that the above description of the present invention is susceptible to various modifications, changes, and adaptations, and the same are intended to be comprehended within the meaning and range of equivalents of the appended claims.

What is claimed is:
1. An arrangement for heating fine-grained material, comprising, in combination: a plurality of vertically oriented axial flow centrifugal powder separators each having, at its top, axial inlet means through which powder enters while flowing in axial direction, at its bottom, axial outlet means through which the non-separated powder leaves while flowing in axial direction, and powder discharge outlet means through which the separated powder leaves, said separators being arranged in pairs such that the separators of each pair are located one above the other and the pairs of separators are located next to each other at approximately the same height; exhaust gas conduit means made up of a plurality of individual sections and serially connecting said separators to each other and to a furnace, the first of said sections leading from the furnace to the axial inlet means of the upper separator of the first pair of separators and each succeeding section leading from the axial outlet means of a separator to the axial inlet means of the next separator in consequence of which exhaust gases from said furnace are fed through said separators one after the other from top to bottom, each section of said exhaust gas conduit means which connects the separators of one pair being arranged at least substantially vertically and being fashioned as a mixing chamber and each section of said exhaust gas conduit means which connects each separator pair with the one next to it extending approximately parallel to said separators; and powder conduit means for connecting the powder discharge outlet means of each separator except the first to that particular section of exhaust gas conduit means which leads to the preceding separator and for connecting the powder discharge outlet means of said first separator to the charging end of the furnace.

2. An arrangement as defined in claim 1 wherein that particular section of said powder conduit means which connects the powder discharge outlet means of said first separator to the charging end of the furnace passes through that particular section of said exhaust gas conduit means which feeds exhaust gases from the charging end of the furnace to said first separator.

3. An arrangement as defined in claim 1 wherein that particular section of said powder conduit means which connects the powder discharge outlet means of said first separator to the charging end of the furnace passes downwardly through that particular section of said exhaust gas conduit means which feeds exhaust gases from the charging end of the furnace to said first separator, said last mentioned section extending upwardly so that the powder and the exhaust gases are in counter-current flow.

4. An arrangement as defined in claim 1 further comprising separating means in that particular section of said exhaust gas conduit means which feeds exhaust gases from the charging ends of the furnace to said first separator for separating deleterious substances from the stream of exhaust gases.

5. An arrangement as defined in claim 4 wherein said separating means comprise a lining made of a material having good heat-conductivity characteristics and cooling means associated with said lining.

6. An arrangement as defined in claim 4 wherein said separating means comprise precipitation sheet means arranged interiorly of said last-mentioned section of exhaust gas conduit means, and means for cooling said sheet means.

7. In an arrangement for heating fine-grained material, which arrangement comprises a plurality of vertically oriented centrifugal axial flow powder separators each of which has, at its top, axial inlet means through which powder enters while flowing in axial direction, at its bottom, axial outlet means through which the non-separated powder leaves while flowing in axial direction, and powder discharge outlet means through which the separated powder leaves, exhaust gas conduit means made up of a plurality of individual sections and serially connecting said separators to each other and to a furnace, the first of said sections leading from the furnace to the axial inlet means of the first separator and each succeeding section leading from the axial outlet means of a separator to the axial inlet means of the next separator in consequence of which exhaust gases from the furnace are fed through said separators one after the other from top to bottom, and powder conduit means for connecting the powder discharge outlet means of each separator except the first to that particular section of said exhaust conduit means which leads to the preceding separator and for connecting the powder discharge outlet means of said first separator to the charging end of the furnace, the improvement that said separators are arranged in pairs such that the separators of each pair are located one above the other and the pairs of separators are located next to each other at approximately the same height; that each section of said exhaust gas conduit means which connects the separators of one pair is arranged at least substantially vertically and is fashioned as a mixing chamber; and that each section of said exhaust gas conduit means which connects each separator pair with the one next to it extends approximately parallel to said separators.

8. In an arrangement as defined in claim 7, the further improvement that that particular section of said powder conduit means which connects the powder discharge outlet means of said first separator to the charging end of the furnace passes downwardly through that particular section of said exhaust gas conduit means which feeds exhaust gases from the charging end of the furnace to said first separator said last-mentioned section extending upwardly so that the powder and the exhaust gases are in counter-current flow.

9. In an arrangement as defined in claim 7, the further improvement which comprises separating means in that particular section of said exhaust gas conduit means which feeds exhaust gases from the charging end of the furnace to said first separator for separating deleterious substances from the stream of exhaust gases.

References Cited in the file of this patent

UNITED STATES PATENTS

| 2,648,714 | Williams et al. | Aug. 1, 1953 |
| 2,785,886 | Muller | Mar. 19, 1957 |

FOREIGN PATENTS

| 859,907 | Great Britain | Jan. 25, 1961 |
| 1,236,700 | France | June 13, 1960 |